US008224673B2

(12) United States Patent
Michalowski et al.

(10) Patent No.: US 8,224,673 B2
(45) Date of Patent: Jul. 17, 2012

(54) SYSTEM AND METHOD FOR ADMINISTERING ANNUITIES

(75) Inventors: Philip W. Michalowski, Glastonbury, CT (US); Keith E. Golembiewski, Suffield, CT (US); Joseph M. Weiss, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 845 days.

(21) Appl. No.: 12/123,739

(22) Filed: May 20, 2008

(65) Prior Publication Data

US 2009/0292564 A1    Nov. 26, 2009

(51) Int. Cl.
*G06Q 40/00* (2012.01)
(52) U.S. Cl. .......................................................... 705/4
(58) Field of Classification Search ........................ None
See application file for complete search history.

(56) References Cited

U.S. PATENT DOCUMENTS

| | | | |
|---|---|---|---|
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,275,807 B1 * | 8/2001 | Schirripa | 705/36 R |
| 6,611,808 B1 | 8/2003 | Preti et al. | |
| 6,611,815 B1 | 8/2003 | Lewis et al. | |
| 7,016,871 B1 | 3/2006 | Fisher et al. | |
| 7,089,201 B1 | 8/2006 | Dellinger et al. | |
| 7,113,913 B1 | 9/2006 | Davis et al. | |
| 7,124,088 B2 | 10/2006 | Bauer et al. | |
| 2001/0014873 A1 | 8/2001 | Henderson et al. | |
| 2001/0047325 A1 | 11/2001 | Livingston | |
| 2002/0035527 A1 | 3/2002 | Corrin | |
| 2002/0174045 A1 | 11/2002 | Arena et al. | |
| 2002/0184129 A1 * | 12/2002 | Arena et al. | 705/35 |
| 2003/0088430 A1 | 5/2003 | Ruark | |
| 2003/0105652 A1 | 6/2003 | Arena et al. | |
| 2003/0120570 A1 | 6/2003 | Dellinger et al. | |
| 2003/0154161 A1 | 8/2003 | Stahl et al. | |
| 2003/0163402 A1 | 8/2003 | Kincart | |
| 2003/0187764 A1 * | 10/2003 | Abbs et al. | 705/35 |

(Continued)

OTHER PUBLICATIONS

Geer, Carolyn T; Roll'em; Forbes; vol. 155, No. 12, p. 172 (Jun. 5, 1995).*

(Continued)

*Primary Examiner* — Alexander Kalinowski
*Assistant Examiner* — Virpi Kanervo
(74) *Attorney, Agent, or Firm* — Howard IP Law Group, PC

(57) ABSTRACT

A computer-implemented method for administering an annuity product includes storing by a processor in memory an amount of an initial funding payment, an interest rate formula and a term for an accumulation annuity, and storing terms including a deferral term for a guaranteed income annuity. If the processor determines that the current time is during the term, the processor calculates an amount of interest earned on the fixed rate annuity and storing in memory a credit of the calculated interest amount to a guaranteed income annuity. After the accumulation period, the processor provides an output signal indicative of instructions to provide a notice of expiration. After the deferral period, the processor calculates an income annuity payment amount from the guaranteed income annuity; and provides an output signal indicative of instructions for a payment to be made to an annuitant based on the income annuity payment amount.

23 Claims, 14 Drawing Sheets

U.S. PATENT DOCUMENTS

| | | | |
|---|---|---|---|
| 2004/0039608 A1 | 2/2004 | Mazur et al. | |
| 2004/0078244 A1* | 4/2004 | Katcher | 705/4 |
| 2004/0088236 A1 | 5/2004 | Manning | |
| 2004/0172350 A1 | 9/2004 | Atkinson et al. | |
| 2004/0181436 A1 | 9/2004 | Lange | |
| 2004/0204951 A1 | 10/2004 | Wood et al. | |
| 2004/0267647 A1 | 12/2004 | Brisbois | |
| 2005/0060251 A1* | 3/2005 | Schwartz et al. | 705/35 |
| 2005/0080698 A1 | 4/2005 | Perg et al. | |
| 2005/0144103 A1 | 6/2005 | Perg et al. | |
| 2005/0234821 A1* | 10/2005 | Benham et al. | 705/40 |
| 2006/0074787 A1 | 4/2006 | Perg et al. | |
| 2006/0080148 A1 | 4/2006 | Koresko | |
| 2006/0085313 A1* | 4/2006 | Selby | 705/35 |
| 2006/0089892 A1 | 4/2006 | Sullivan et al. | |
| 2006/0143055 A1 | 6/2006 | Loy et al. | |
| 2006/0149651 A1 | 7/2006 | Robinson | |
| 2006/0190373 A1 | 8/2006 | Perg et al. | |
| 2006/0206398 A1 | 9/2006 | Coughlin | |
| 2006/0206401 A1 | 9/2006 | Abbs et al. | |
| 2006/0212379 A1 | 9/2006 | Perg et al. | |
| 2006/0212380 A1 | 9/2006 | Williams et al. | |
| 2007/0011063 A1 | 1/2007 | Shelon et al. | |
| 2007/0011069 A1 | 1/2007 | Bevacqua, Jr. | |
| 2007/0011086 A1 | 1/2007 | Dellinger et al. | |
| 2007/0021986 A1 | 1/2007 | Cheung et al. | |
| 2007/0038488 A1 | 2/2007 | Bauer et al. | |
| 2007/0078690 A1 | 4/2007 | Kohl | |
| 2007/0100715 A1 | 5/2007 | O'Donnell et al. | |
| 2007/0100720 A1 | 5/2007 | Bonvouloir | |
| 2007/0100727 A1 | 5/2007 | Multer et al. | |
| 2007/0106589 A1 | 5/2007 | Schirripa | |
| 2007/0162380 A1 | 7/2007 | Conroy | |
| 2007/0198352 A1 | 8/2007 | Kannegiesser | |
| 2007/0198377 A1 | 8/2007 | Livingston et al. | |
| 2007/0239572 A1 | 10/2007 | Harris et al. | |
| 2007/0244777 A1 | 10/2007 | Torre et al. | |
| 2007/0271201 A1 | 11/2007 | Armand et al. | |
| 2007/0278288 A1 | 12/2007 | Simmons | |
| 2008/0052133 A1* | 2/2008 | Kravirtz et al. | 705/4 |
| 2008/0301035 A1* | 12/2008 | Mercier et al. | 705/37 |

OTHER PUBLICATIONS

Gold, Andrew; Individual and Group Annuities in 1991; Best's Review (Life/Health); vol. 93, No. 7, p. 78 (Nov. 1992).*
Karlin, Michael; The Life Cycle Pension Plan: A Step Ahead; Pension World; vol. 28, No. 5, p. 24 (May 1992).*
International Search Report dated Feb. 5, 2009.
Key to Making Retirement Savings last: The Withdrawal Rate, New York Life, www.newyorklife.com/cda/0,3254,14198,00.html. (accessed May 22, 2008).
Prospectus, Penn Mutual Variable Annuity Account III, Enhanced Credit Variable Annuity; May 1, 2007.
"Glossary of Insurance Terms", Insurance Information Institute, http:www.iii.org/media/glossary (Jan. 1, 2008).
Penn Mutual Variable Annuity Account III, SEC Form 497, Filed Oct. 2, 2006.
New York Life Longevity Benefit Variable Annuity Brochure, New York Life Insurance Company, May 2007.
New York Life Longevity Benefit Variable Annuity FactSheet, New York Life Insurance Company, May 2007.
Paradis, T., More Funds Adopt Performance-Based Fees, Washingtonpost.com (Associated Press), Apr. 8, 2007.
"Facts about the New York Life Longevity Benefit Variable Annuity Product", New York Life Insurance Company, May 2007.
New York Life Longevity Benefit Variable Annuity Prospectus Amendment dated Aug. 15, 2007, New York Life Insurance Company, Aug. 2007.
S&P U.S. Indices Index Methodology, Standard & Poor's, Sep. 2007.
Blodget, H., Money for Nothing: The Real Trouble with Mutual Funds, Slate.com, Dec. 1, 2004.
"Income Select for Life"; Transamerica Financial Life Insurance Company; https://www.transamericaadvisor.com/contentServer/MediaServer? uri=/site/tciidex/media/PDF/Annuities_TCI/Client_Approved_Material/Tips_and_Techniques/.BRIS.pdf.
"Jackson Enhances Living Benefit Options within its Perspective Family of Variable Annuities"; Business Wire; Apr. 30, 2007.
"Learn the Basics about Lifetime Legacy"; http://www.americo.com/lifetime/lifetimelegacy.html; Accessed Jan. 4, 2008.
"Accelerated Death Benefits"; http://www.medicare.gov/; Accessed Jan. 4, 2008.
"Alternatives to Long Term Care Insurance (LTCi)"; Senior Wealth Protection Advocates; http://www.senior-wealth-protection-advocates.com/long-term-care-insurancealternatives.html; Site Accessed Jan. 4, 2008.
Form N-4, Transamerica Life Insurance Company; Separate Account VA B; filed Apr. 26, 2006.
Form N-4, Transamerica Life Insurance Company; Flexible Premium Variable Annuity-J; Separate Account VA Y; filed Feb. 22, 2006.
"Fidelity.com Glossary" (letter "p"); https://scs.fidelity.com/webxpress/help/topics/help_definition_p.shtml; Accessed Jan. 4, 2008.
Stout, R.G. et al.; "Dynamic Retirement Withdrawal Planning"; Financial Services Review 15 (2006) 117-131.
"Prudential Investments Introduces Strategic Partners Annuity One; New Variable Annuity Offers Investors World-Class Money Managers and Flexible Product Features"; Business Wire, Oct. 9, 2000.
"Retireonyourterms"; http://www.retireonyourterms.com/ glossary/GlossaryText.htm; Accessed Jan. 4, 2008.
Buckingham, B.; "Making IRAs Last a Lifetime with Annuities"; Life & Health Advisor; Mar. 2006.
"RiverSource Innovations Select Variable Annuity"; http://www.riversource.com/rvsc/global/docs/INNOV-SELECT-NY-AAG.pdf.
"Pacific Life Individual (k) Program"; https://annuities.myaccount.pacificlife.com/public/corporate/product_info/pos/guide pos_1911-07b.pdf.
"Just the Facts: The Best of America All American Gold Annuity Key Facts"; Nationwide Financial Services, Inc.; https://ssc.nwseivicecenter.com/media/pdf/product/VAM-0504AO-FLpdf.

* cited by examiner

| Client Age | AV | Interest Rate | Interest Earned | HIS Funding | HIS Income |
|---|---|---|---|---|---|
| 67 | $100,000 | 5.5% | $5,500 | $5,500 | $0 |
| 68 | $100,000 | 5.5% | $5,500 | $5,500 | $0 |
| 69 | $100,000 | 5.5% | $5,500 | $5,500 | $0 |
| 70 | $100,000 | 5.5% | $5,500 | $5,500 | $0 |
| 71 | $100,000 | 5.5% | $5,500 | $5,500 | $0 |
| 72 | $100,000 | 5.5% | $5,500 | $5,500 | $0 |
| 73 | $100,000 | 5.5% | $5,500 | $5,500 | $0 |
| 74 | $100,000 | 5.5% | $5,500 | $5,500 | $0 |
| 75 | $100,000 | 5.5% | $5,500 | $5,500 | $0 |
| 76 | $100,000 | 5.5% | $5,500 | $5,500 | $0 |
| Renewal | | | | | |
| 77 | $100,000 | 5.5% | $5,500 | $0 | $9,594 |
| 78 | $105,500 | 5.5% | $5,803 | $0 | $9,594 |
| 79 | $111,303 | 5.5% | $6,122 | $0 | $9,594 |
| 80 | $117,424 | 5.5% | $6,458 | $0 | $9,594 |
| 81 | $123,882 | 5.5% | $6,814 | $0 | $9,594 |
| 82 | $130,696 | 5.5% | $7,188 | $0 | $9,594 |
| 83 | $137,884 | 5.5% | $7,584 | $0 | $9,594 |
| 84 | $145,468 | 5.5% | $8,001 | $0 | $9,594 |
| 85 | $153,469 | 5.5% | $8,441 | $0 | $9,594 |
| 86 | $161,909 | 5.5% | $8,905 | $0 | $9,594 |
| | | | | | $95,935 |

FIG. 8A

| Client Age | AV | Interest Rate | Interest Earned | HIS Funding | HIS Income | Interest AIP | Total Income |
|---|---|---|---|---|---|---|---|
| 67 | $100,000 | 5.5% | $5,500 | $5,500 | $0 | $0 | $0 |
| 68 | $100,000 | 5.5% | $5,500 | $5,500 | $0 | $0 | $0 |
| 69 | $100,000 | 5.5% | $5,500 | $5,500 | $0 | $0 | $0 |
| 70 | $100,000 | 5.5% | $5,500 | $5,500 | $0 | $0 | $0 |
| 71 | $100,000 | 5.5% | $5,500 | $5,500 | $0 | $0 | $0 |
| 72 | $100,000 | 5.5% | $5,500 | $5,500 | $0 | $0 | $0 |
| 73 | $100,000 | 5.5% | $5,500 | $5,500 | $0 | $0 | $0 |
| 74 | $100,000 | 5.5% | $5,500 | $5,500 | $0 | $0 | $0 |
| 75 | $100,000 | 5.5% | $5,500 | $5,500 | $0 | $0 | $0 |
| 76 | $100,000 | 5.5% | $5,500 | $5,500 | $0 | $0 | $0 |
| Renewal | | | | | | | |
| 77 | $100,000 | 5.5% | $5,500 | $0 | $9,594 | $5,500 | $15,094 |
| 78 | $100,000 | 5.5% | $5,500 | $0 | $9,594 | $5,500 | $15,094 |
| 79 | $100,000 | 5.5% | $5,500 | $0 | $9,594 | $5,500 | $15,094 |
| 80 | $100,000 | 5.5% | $5,500 | $0 | $9,594 | $5,500 | $15,094 |
| 81 | $100,000 | 5.5% | $5,500 | $0 | $9,594 | $5,500 | $15,094 |
| 82 | $100,000 | 5.5% | $5,500 | $0 | $9,594 | $5,500 | $15,094 |
| 83 | $100,000 | 5.5% | $5,500 | $0 | $9,594 | $5,500 | $15,094 |
| 84 | $100,000 | 5.5% | $5,500 | $0 | $9,594 | $5,500 | $15,094 |
| 85 | $100,000 | 5.5% | $5,500 | $0 | $9,594 | $5,500 | $15,094 |
| 86 | $100,000 | 5.5% | $5,500 | $0 | $9,594 | $5,500 | $15,094 |
| | | | | | | | $150,935 |

FIG. 8B

| Client Age | AV | Interest Rate | Interest Earned | HIS Funding | HIS Income |
|---|---|---|---|---|---|
| 67 | $75,000 | 5.5% | $4,125 | $25,000 | $0 |
| 68 | $79,125 | 5.5% | $4,352 | $0 | $0 |
| 69 | $83,477 | 5.5% | $4,591 | $0 | $0 |
| 70 | $88,068 | 5.5% | $4,844 | $0 | $0 |
| 71 | $92,912 | 5.5% | $5,110 | $0 | $0 |
| 72 | $98,022 | 5.5% | $5,391 | $0 | $0 |
| 73 | $103,413 | 5.5% | $5,688 | $0 | $0 |
| 74 | $109,101 | 5.5% | $6,001 | $0 | $0 |
| 75 | $115,101 | 5.5% | $6,331 | $0 | $0 |
| 76 | $121,432 | 5.5% | $6,679 | $0 | $0 |
| Renewal | | | | | |
| 77 | $128,111 | 5.5% | $7,046 | $0 | $4,100 |
| 78 | $135,157 | 5.5% | $7,434 | $0 | $4,100 |
| 79 | $142,591 | 5.5% | $7,842 | $0 | $4,100 |
| 80 | $150,433 | 5.5% | $8,274 | $0 | $4,100 |
| 81 | $158,707 | 5.5% | $8,729 | $0 | $4,100 |
| 82 | $167,436 | 5.5% | $9,209 | $0 | $4,100 |
| 83 | $176,645 | 5.5% | $9,715 | $0 | $4,100 |
| 84 | $186,360 | 5.5% | $10,250 | $0 | $4,100 |
| 85 | $196,610 | 5.5% | $10,814 | $0 | $4,100 |
| 86 | $207,424 | 5.5% | $11,408 | $0 | $4,100 |
| | | | | | $41,000 |

FIG. 8C

| Client Age | AV | Interest Rate | Interest Earned | HIS Funding | HIS Income | Interest AIP | Total Income |
|---|---|---|---|---|---|---|---|
| 67 | $75,000 | 5.5% | $4,125 | $25,000 | $0 | $0 | $0 |
| 68 | $79,125 | 5.5% | $4,352 | $0 | $0 | $0 | $0 |
| 69 | $83,477 | 5.5% | $4,591 | $0 | $0 | $0 | $0 |
| 70 | $88,068 | 5.5% | $4,844 | $0 | $0 | $0 | $0 |
| 71 | $92,912 | 5.5% | $5,110 | $0 | $0 | $0 | $0 |
| 72 | $98,022 | 5.5% | $5,391 | $0 | $0 | $0 | $0 |
| 73 | $103,413 | 5.5% | $5,688 | $0 | $0 | $0 | $0 |
| 74 | $109,101 | 5.5% | $6,001 | $0 | $0 | $0 | $0 |
| 75 | $115,101 | 5.5% | $6,331 | $0 | $0 | $0 | $0 |
| 76 | $121,432 | 5.5% | $6,679 | $0 | $0 | $0 | $0 |
| | Renewal | | | | | | |
| 77 | $128,111 | 5.5% | $7,046 | $0 | $4,100 | $7,046 | $11,146 |
| 78 | $128,111 | 5.5% | $7,046 | $0 | $4,100 | $7,046 | $11,146 |
| 79 | $128,111 | 5.5% | $7,046 | $0 | $4,100 | $7,046 | $11,146 |
| 80 | $128,111 | 5.5% | $7,046 | $0 | $4,100 | $7,046 | $11,146 |
| 81 | $128,111 | 5.5% | $7,046 | $0 | $4,100 | $7,046 | $11,146 |
| 82 | $128,111 | 5.5% | $7,046 | $0 | $4,100 | $7,046 | $11,146 |
| 83 | $128,111 | 5.5% | $7,046 | $0 | $4,100 | $7,046 | $11,146 |
| 84 | $128,111 | 5.5% | $7,046 | $0 | $4,100 | $7,046 | $11,146 |
| 85 | $128,111 | 5.5% | $7,046 | $0 | $4,100 | $7,046 | $11,146 |
| 86 | $128,111 | 5.5% | $7,046 | $0 | $4,100 | $7,046 | $11,146 |
| | | | | | | | $111,461 |

FIG. 8D

| Client Age | AV | Interest Rate | Interest Earned | Interest Sweep To HIS | HIS Income |
|---|---|---|---|---|---|
| 60 | $100,000 | 5.5% | $5,500 | $5,500 | $0 |
| 61 | $100,000 | 5.5% | $5,500 | $5,500 | $0 |
| 62 | $100,000 | 5.5% | $5,500 | $5,500 | $0 |
| 63 | $100,000 | 5.5% | $5,500 | $5,500 | $0 |
| 64 | $100,000 | 5.5% | $5,500 | $5,500 | $0 |
| 65 | $100,000 | 5.5% | $5,500 | $5,500 | $0 |
| 66 | $100,000 | 5.5% | $5,500 | $5,500 | $0 |
| 67 | $100,000 | 5.5% | $5,500 | $5,500 | $0 |
| 68 | $100,000 | 5.5% | $5,500 | $5,500 | $0 |
| 69 | $100,000 | 5.5% | $5,500 | $5,500 | $0 |
| Renewal | | | | | |
| 70 | $100,000 | 5.5% | $5,500 | $0 | $7,188 |
| 71 | $105,500 | 5.5% | $5,803 | $0 | $7,188 |
| 72 | $111,303 | 5.5% | $6,122 | $0 | $7,188 |
| 73 | $117,424 | 5.5% | $6,458 | $0 | $7,188 |
| 74 | $123,882 | 5.5% | $6,814 | $0 | $7,188 |
| 75 | $130,696 | 5.5% | $7,188 | $0 | $7,188 |
| 76 | $137,884 | 5.5% | $7,584 | $0 | $7,188 |
| 77 | $145,468 | 5.5% | $8,001 | $0 | $7,188 |
| 78 | $153,469 | 5.5% | $8,441 | $0 | $7,188 |
| 79 | $161,909 | 5.5% | $8,905 | $0 | $7,188 |
| Renewal | | | | | |
| 80 | $170,814 | 5.5% | $9,395 | $0 | $7,188 |
| 81 | $180,209 | 5.5% | $9,912 | $0 | $7,188 |
| 82 | $190,121 | 5.5% | $10,457 | $0 | $7,188 |
| 83 | $200,577 | 5.5% | $11,032 | $0 | $7,188 |
| 84 | $211,609 | 5.5% | $11,639 | $0 | $7,188 |
| 85 | $223,248 | 5.5% | $12,279 | $0 | $7,188 |
| 86 | $235,526 | 5.5% | $12,954 | $0 | $7,188 |
| 87 | $248,480 | 5.5% | $13,666 | $0 | $7,188 |
| 88 | $262,147 | 5.5% | $14,418 | $0 | $7,188 |
| 89 | $276,565 | 5.5% | $15,211 | $0 | $7,188 |
| | | | | | $143,765 |

FIG. 8E

| Client Age | AV | Interest Rate | Interest Earned | Interest Sweep To HIS | HIS Income | Interest AIP | Total Income |
|---|---|---|---|---|---|---|---|
| 60 | $100,000 | 5.5% | $5,500 | $5,500 | $0 | $0 | $0 |
| 61 | $100,000 | 5.5% | $5,500 | $5,500 | $0 | $0 | $0 |
| 62 | $100,000 | 5.5% | $5,500 | $5,500 | $0 | $0 | $0 |
| 63 | $100,000 | 5.5% | $5,500 | $5,500 | $0 | $0 | $0 |
| 64 | $100,000 | 5.5% | $5,500 | $5,500 | $0 | $0 | $0 |
| 65 | $100,000 | 5.5% | $5,500 | $5,500 | $0 | $0 | $0 |
| 66 | $100,000 | 5.5% | $5,500 | $5,500 | $0 | $0 | $0 |
| 67 | $100,000 | 5.5% | $5,500 | $5,500 | $0 | $0 | $0 |
| 68 | $100,000 | 5.5% | $5,500 | $5,500 | $0 | $0 | $0 |
| 69 | $100,000 | 5.5% | $5,500 | $5,500 | $0 | $0 | $0 |
| Renewal | | | | | | | |
| 70 | $100,000 | 5.5% | $5,500 | $0 | $7,188 | $5,500 | $12,688 |
| 71 | $100,000 | 5.5% | $5,500 | $0 | $7,188 | $5,500 | $12,688 |
| 72 | $100,000 | 5.5% | $5,500 | $0 | $7,188 | $5,500 | $12,688 |
| 73 | $100,000 | 5.5% | $5,500 | $0 | $7,188 | $5,500 | $12,688 |
| 74 | $100,000 | 5.5% | $5,500 | $0 | $7,188 | $5,500 | $12,688 |
| 75 | $100,000 | 5.5% | $5,500 | $0 | $7,188 | $5,500 | $12,688 |
| 76 | $100,000 | 5.5% | $5,500 | $0 | $7,188 | $5,500 | $12,688 |
| 77 | $100,000 | 5.5% | $5,500 | $0 | $7,188 | $5,500 | $12,688 |
| 78 | $100,000 | 5.5% | $5,500 | $0 | $7,188 | $5,500 | $12,688 |
| 79 | $100,000 | 5.5% | $5,500 | $0 | $7,188 | $5,500 | $12,688 |
| Renewal | | | | | | | |
| 80 | $100,000 | 5.5% | $5,500 | $0 | $7,188 | $5,500 | $12,688 |
| 81 | $100,000 | 5.5% | $5,500 | $0 | $7,188 | $5,500 | $12,688 |
| 82 | $100,000 | 5.5% | $5,500 | $0 | $7,188 | $5,500 | $12,688 |
| 83 | $100,000 | 5.5% | $5,500 | $0 | $7,188 | $5,500 | $12,688 |
| 84 | $100,000 | 5.5% | $5,500 | $0 | $7,188 | $5,500 | $12,688 |
| 85 | $100,000 | 5.5% | $5,500 | $0 | $7,188 | $5,500 | $12,688 |
| 86 | $100,000 | 5.5% | $5,500 | $0 | $7,188 | $5,500 | $12,688 |
| 87 | $100,000 | 5.5% | $5,500 | $0 | $7,188 | $5,500 | $12,688 |
| 88 | $100,000 | 5.5% | $5,500 | $0 | $7,188 | $5,500 | $12,688 |
| 89 | $100,000 | 5.5% | $5,500 | $0 | $7,188 | $5,500 | $12,688 |
| | | | | | | | $253,765 |

FIG. 8F

SYSTEM AND METHOD FOR ADMINISTERING ANNUITIES

FIELD OF INVENTION

The present invention relates to computer systems, and particularly to computer systems for calculating features of financial products.

BACKGROUND

An annuity is a type of insurance service. In general terms, in an annuity contract, an insurance company and an annuitant contract for the annuitant to make one or more payments to the insurance company. For that consideration, the insurance company makes periodic payments to an annuitant. By way of example, the insurance company may be obliged to make a payment of a predetermined amount to the annuitant annually for a predetermined time period. In another example, the insurance company is obliged to make payments of a predetermined amount to the annuitant annually for the life of the annuitant.

In a typical annuity product, an asset value associated with an account is annuitized. In other words, the asset value is not available for use by the annuitant, or for use in estate planning.

In the prior art, one exemplary product provides a variable annuity, based on a single premium, which also includes a stream of payments, funded by an additional fee, that commences at an age selected by the annuitant.

SUMMARY OF THE INVENTION

In one embodiment, a computer system for administering an annuity has a processor and a memory in communication with the processor. The processor is adapted to: store in the memory an amount of an initial funding payment, an interest rate formula and a term for an accumulation annuity; store in the memory at least a deferral period of a guaranteed income annuity; if the current time is during the term, calculate an amount of interest earned on the accumulation annuity; store in the memory a credit of the calculated interest amount to a guaranteed income annuity; determine whether the time is after the accumulation period, and if the time is after the accumulation period, provide an output signal indicative of an instruction to provide a notice of expiration; determine whether the current time is after the expiration of the deferral period, and, if the current time is after the expiration of the deferral period, calculate an income annuity payment amount from the guaranteed income annuity; and provide an output signal indicative of instructions for a payment to be made to the annuitant based on the income annuity payment amount.

In an embodiment, a computer-implemented method for administering an annuity product includes storing by a processor in a memory in communication with the processor an amount of an initial funding payment, an interest rate formula and a term for an accumulation annuity; storing by the processor in the memory at least a deferral period of a guaranteed income annuity; if the processor determines that the current time is during the term, calculating by the processor an amount of interest earned on the accumulation annuity, and storing by the processor the amount in the memory; storing by the processor in the memory a credit of the calculated interest amount to a guaranteed income annuity; if the processor determines that the current time is after the accumulation period, providing by the processor an output signal indicative of an instruction to provide a notice of expiration; if the processor determines that the current time is after the expiration of the deferral period, calculating by the processor an income annuity payment amount from the guaranteed income annuity; and providing by the processor an output signal indicative of instructions for a payment to be made to the annuitant based on the income annuity payment amount.

In an embodiment, a computer-readable medium has instructions thereon which, when executed by a processor, cause the processor to: store in memory an amount of an initial funding payment, an interest rate formula and a term for an accumulation annuity; store in memory at least a deferral period of a guaranteed income annuity; determine if the current time is during the term, and, if the current time is during the term, calculate an amount of interest earned on the accumulation annuity; store in memory a credit of the calculated interest amount to a guaranteed income annuity; determine if the current time is after the accumulation period and, if the current time is after the accumulation period, provide an output signal indicative of an instruction to provide a notice of expiration; determine if the current time is after the expiration of the deferral period, and, if the current time is after the expiration of the deferral period, calculate an income annuity payment amount from the guaranteed income annuity; and provide an output signal indicative of instructions for a payment to be made to the annuitant based on the income annuity payment amount.

In an embodiment, a computer system for administering an annuity has a processor and a memory in communication with the processor. The processor is adapted to store in a memory in communication with the processor an amount of an initial funding payment, an interest rate formula and a term for an accumulation annuity; store in the memory a deferral period and an initial funding payment of a guaranteed income annuity; determine if the current time is during the accumulation annuity term and, if the current time is during the term, calculate an amount of interest earned on the accumulation annuity; store in the memory a credit of the calculated interest amount at least to the accumulation annuity; determine if the current time is during the accumulation annuity term, and if the time is after the accumulation period, provide an output signal indicative of an instruction to provide a notice of expiration; determine if the current time is after the expiration of the deferral period, and, if the time is after the expiration of the deferral period, calculate an income annuity payment amount from the guaranteed income annuity and store the calculated income annuity payment amount in the memory; and provide an output signal indicative of instructions for a payment to be made to the annuitant based on the calculated income annuity payment amount.

In an embodiment, a computer-implemented method for administering an annuity includes storing by a processor in a memory in communication with the processor an amount of an initial funding payment, an interest rate formula and a term for an accumulation annuity; storing by the processor in the memory a deferral period and an initial funding payment of a guaranteed income annuity; determining by the processor if the current time is during the accumulation annuity term and, if the current time is during the term, calculating by the processor an amount of interest earned on the accumulation annuity; storing by the processor in the memory a credit of the calculated interest amount at least to the accumulation annuity; determining by the processor if the current time is during the accumulation annuity term, and if the time is after the accumulation annuity term, providing by the processor an output signal indicative of an instruction to provide a notice of expiration; determining by the processor if the current time is after the expiration of the deferral period, and, if the time is after the expiration of the deferral period, calculating by the processor of an income annuity payment amount from the guaranteed income annuity and storing by the processor of the calculated income annuity payment amount in the memory; and providing by the processor an output signal indicative of instructions for a payment to be made to the annuitant based on the calculated income annuity payment amount.

In an embodiment, a computer-readable medium has instructions thereon which, when executed by a processor, cause the processor to: store in a memory in communication with the processor an amount of an initial funding payment, an interest rate formula and a term for an accumulation annuity; store in the memory a deferral period and an initial funding payment of a guaranteed income annuity; determine if the current time is during the accumulation annuity term and, if the current time is during the accumulation annuity term, calculate an amount of interest earned on the accumulation annuity; store in the memory a credit of the calculated interest amount at least to the accumulation annuity; determine if the current time is during the accumulation annuity term, and if the time is after the accumulation annuity term, provide an output signal indicative of an instruction to provide a notice of expiration; determine if the current time is after the expiration of the deferral period, and, if the time is after the expiration of the deferral period, calculate an income annuity payment amount from the guaranteed income annuity and store the calculated income annuity payment amount in the memory; and provide an output signal indicative of instructions for a payment to be made to the annuitant based on the calculated income annuity payment amount.

BRIEF DESCRIPTION OF THE DRAWINGS

FIGS. 8A, 8B, 8C, 8D, 8E and 8F are tables illustrating implementations of the method and system of the invention.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems, and methods for administration of insurance products such as annuities. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
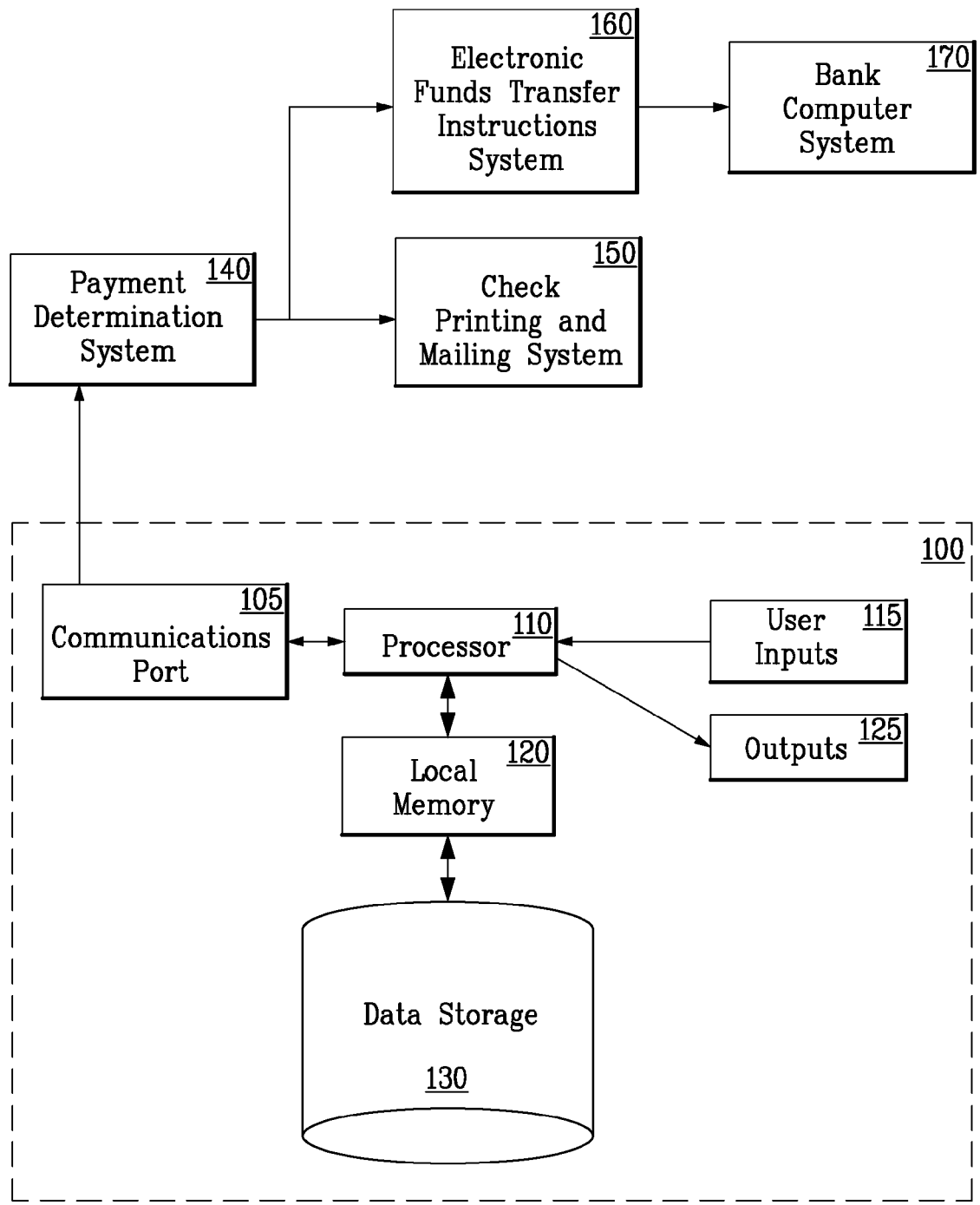
FIG. 1 is a schematic diagram of an exemplary computer system for implementation of a method and system of the invention.

Referring to FIG. 1, an exemplary computer system for use in the implementation of the invention will now be described. In computer system 100, processor 110 executes instructions contained in programs stored on stored media. Processor 110 communicates, such as through suitable buses and other data channels, with communications port 105 and local memory 110, receives data from user inputs 115, and provides data to outputs 125. Local memory 120 is configured to exchange data with processor 110, and may store programs containing processor-executable instructions, and values of variables for use by such programs. Data storage 130 may include a wide variety of data acquired and processed in accordance with the invention. User input may be provided at inputs 115, which may include keyboards, pointing devices such as mice, and touchscreens. In an embodiment, inputs 115 may include user interfaces, including workstations having keyboards, touchscreens, pointing devices such as mice, or other user input devices, connected via networked communications to processor 110. Outputs 125 may include displays and printers. Communications port 105 may communicate with remote sources of information, and with systems for implementing instructions output by processor 110. Communication may be by one or more of suitable communication methods, including over wired or wireless local area networks and wide area networks, and over communications between networks, including over the Internet. Any suitable data and communication protocols may be employed.

Communications port 105 may communicate with payment determination system 140. Payment determination system 140 may include one or more computer systems, including processors, memory devices, user inputs, outputs, software executed by the processors, and other conventional components. Payment determination system 140 may be adapted to receive an output signal via communications port 105, which output signal includes payment information, such as an amount, a date payable, and information identifying an annuitant. Payment determination system 140 may further be adapted to determine a payor account and a payment method. The payor account may be an account with a selected bank; by way of example, payment determination system 140 may include a look-up table mapping annuitant information, such as geographic information, to a particular bank and account. Payment determination system 140 may also include stored in memory and accessible by a processor information indicating whether a particular annuitant is to be paid by paper check, by electronic funds transfer, or in some other manner. A processor of payment determination system 140 may cause to be stored in memory of the payment determination system the determined payor account information and the determined payment method. The processor of payment determination system 140 may cause a digital signal to be output indicative of the stored payor account information, the stored payment method, amount information and payee information.

In an embodiment, the output digital signal may be received by check printing and mailing system 150. Check printing and mailing system 150 may include one or more computer systems, including processors, memory devices, user inputs, outputs, software executed by the processors, and other conventional components. The outputs include in particular one or more printers, and may include other devices useful in printing and mailing paper checks, such as devices for feeding paper, separating printed checks, inserting printed checks into envelopes, sealing envelopes, and applying postage to envelopes as appropriate. The printed check is then mailed to the annuitant. The annuitant deposits the check in the annuitant's bank account, causing funds to be credited to the annuitant's bank account, and causing the funds to be withdrawn from the designated bank account from which the payment is made.

In an embodiment, the output digital signal from payment determination system 140 may be received by electronic funds transfer instructions system 160. Electronic funds transfer instructions system 160 may include one or more computer systems, including processors, memory devices, user inputs, outputs, software executed by the processors, and other conventional components. Electronic funds transfer instructions system 160 includes a processor adapted to provide an output signal indicative of an instruction to a bank determined by the payor account information to provide an electronic funds transfer from the payor account to a payee account in an amount as previously determined, such as by processor 110.

The output signal from electronic funds transfer instructions system 160 may be provided to a bank computer system 170, which carries out an electronic funds transfer, debiting the designated account, and resulting in a credit to a designated annuitant account.

Figure 2:
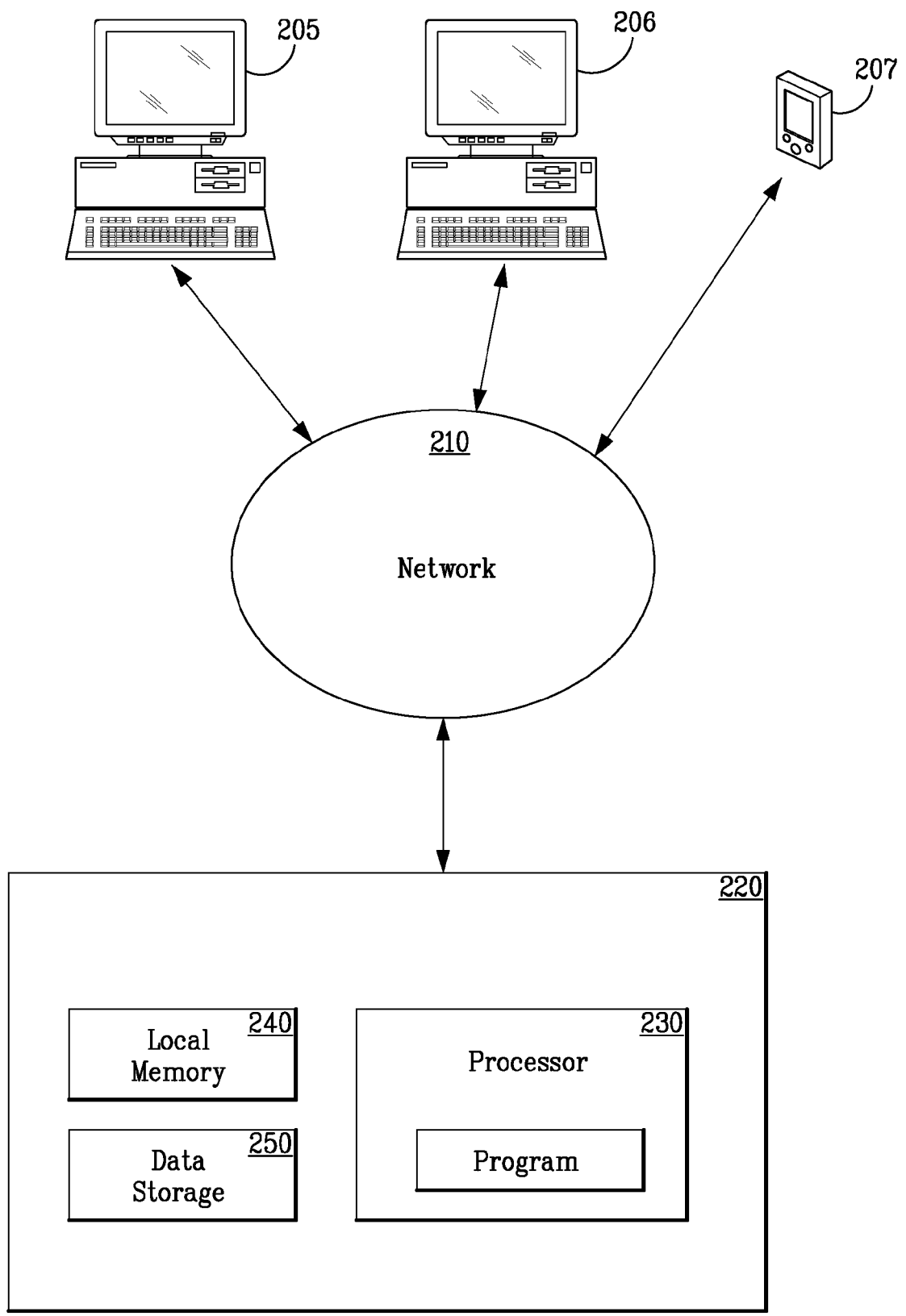
FIG. 2 is a schematic diagram of an exemplary network for implementation of a method and system of the invention.

Referring now to FIG. 2, a schematic diagram of a client server arrangement for implementation of a method and system in accordance with an embodiment of the invention is presented. In the arrangement of FIG. 2, client devices 205, 206, 207 may be connected via network 210 to server 220. In an implementation, client devices 205, 206, 207 may be personal computers running an operating system such as Windows XP, Windows Vista, or Apple Tiger, thin client devices, portable devices such as personal digital assistants (running the Palm OS, by way of example), cell phones, or other devices. Client devices may be operated variously by individual prospective annuitants, insurance brokers or other financial advisors, or by personnel of an insurance service provider. Network 210 may be or include the Internet, a corporate intranet, wireless and wired communications channels, and other network features. Server 220 may include processor 230 having local memory 240 and data storage 250. Program 260 runs on processor 230. Program 260 may initiate sessions with one more of client devices 205, 206, 207. Program 260 may prompt the user for information regarding available assets, desired income and desired asset value goals, and based on information received and various algorithms related to annuity contracts, provide examples. Program 260 may also provide a web front end, and be linked to back end computer systems for implementing administration of annuities. Program 260 may be, by way of example only, a Java-based program.

A challenge that has been recognized by the inventors is that of both preserving the asset value associated with an annuity and providing a guaranteed stream of income to the annuitant. For example, in a single premium immediate annuity (SPIA), while a stream of income is guaranteed, the principal is not available. Variable annuities provide access to principal, but their income potential is dependent on market performance. As a result, variable annuities fail to provide a predictable stream of income to the annuitant. One solution in the prior art to the problem of providing a predictable stream of income to the annuitant who purchases a variable annuity is for the annuitant to purchase a guaranteed minimum withdrawal benefit (GMWB) rider. The GMWB rider, as its name implies, provides a guarantee of a certain minimum income level, even if the asset value of the variable annuity declines to a point which would not otherwise support the minimum income level. However, the GMWB rider is purchased at an additional cost to the annuitant. The asset value of variable annuities is also linked to the value of securities or of indices based on values of securities, and thus is not predictable.

Figure 3:
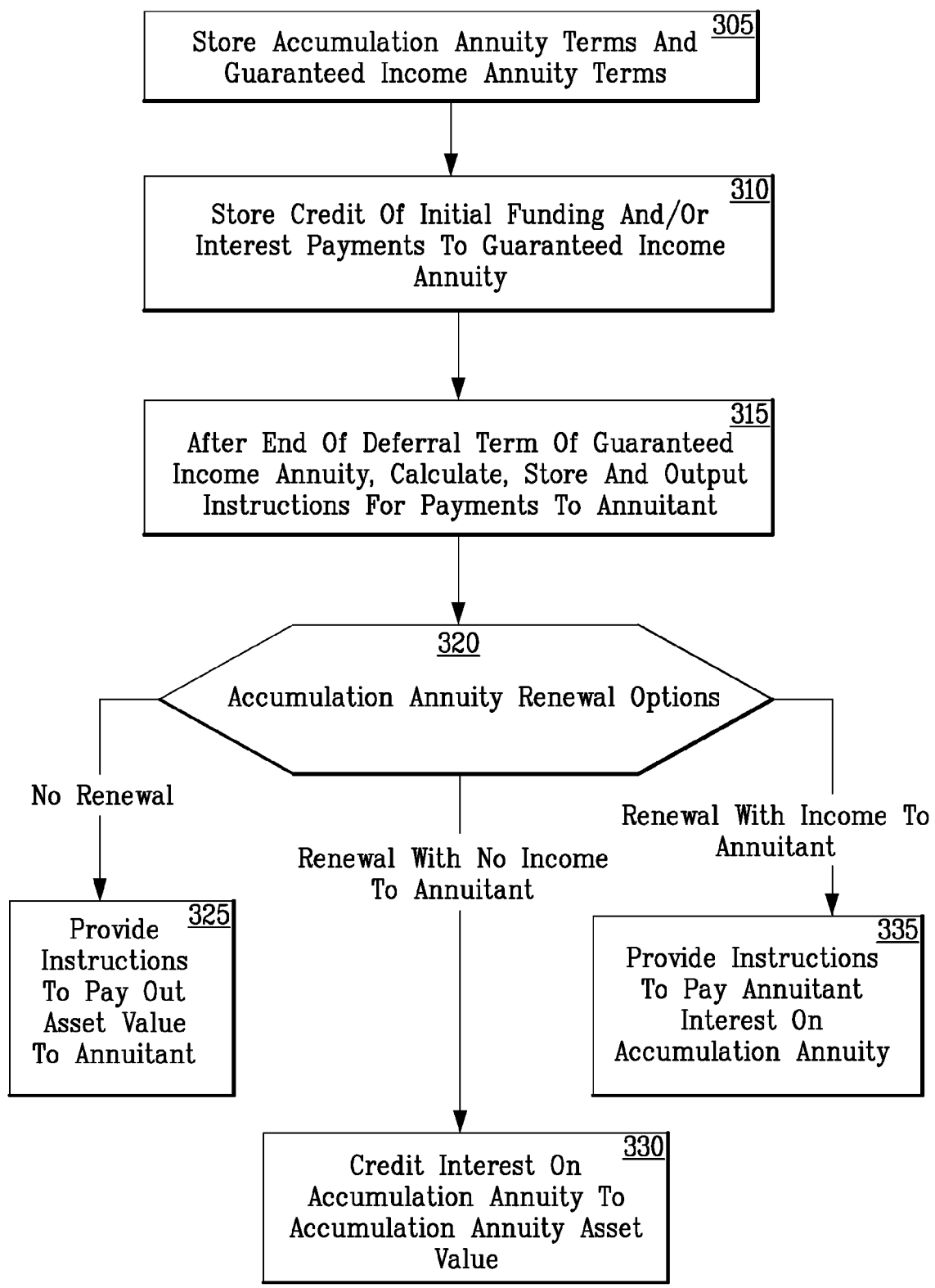
FIG. 3 is a process flow diagram illustrating a method for administering annuities implemented by the computer system of FIG. 1.

Referring now to FIG. 3, a high level process flow of a method for administering an annuity product will be explained, with reference to the computer system of FIG. 1. In accordance with an implementation, an insurance company and a user, who may be the annuitant, have entered into an insurance contract for funding of an annuity. The annuity contract includes both an accumulation annuity and a guaranteed income annuity. A processor may store terms of the accumulation annuity and the guaranteed income annuity 305. Terms are discussed below. The processor may store a credit of initial funding and/or payments of interest on the accumulation annuity to the guaranteed income annuity 310. After the end of the deferral term of the guaranteed income annuity, the amount and timing of periodic payments to the annuitant may be calculated, such as by processor 110 and stored in memory, and output instructions for payments to the annuitant may be formulated and output 315. After the end of an initial term of the accumulation annuity, various accumulation annuity renewal options may be implemented 320 in accordance with instructions from an annuitant. If instructions provide for no renewal, then a processor may provide instructions to pay out an asset value to the annuitant, as indicated by block 325. If instructions provide for renewal of the accumulation annuity with no income from the accumulation annuity to the annuitant, then interest on the accumulation annuity is credited in the future to the accumulation annuity asset value 330. If the instructions provide for renewal with income to the annuitant, then instructions are provided, such as by a processor 110, for payment of the annuitant of interest credited on the accumulation annuity. The asset value of the accumulation annuity remains constant in that scenario.

Figure 4A:
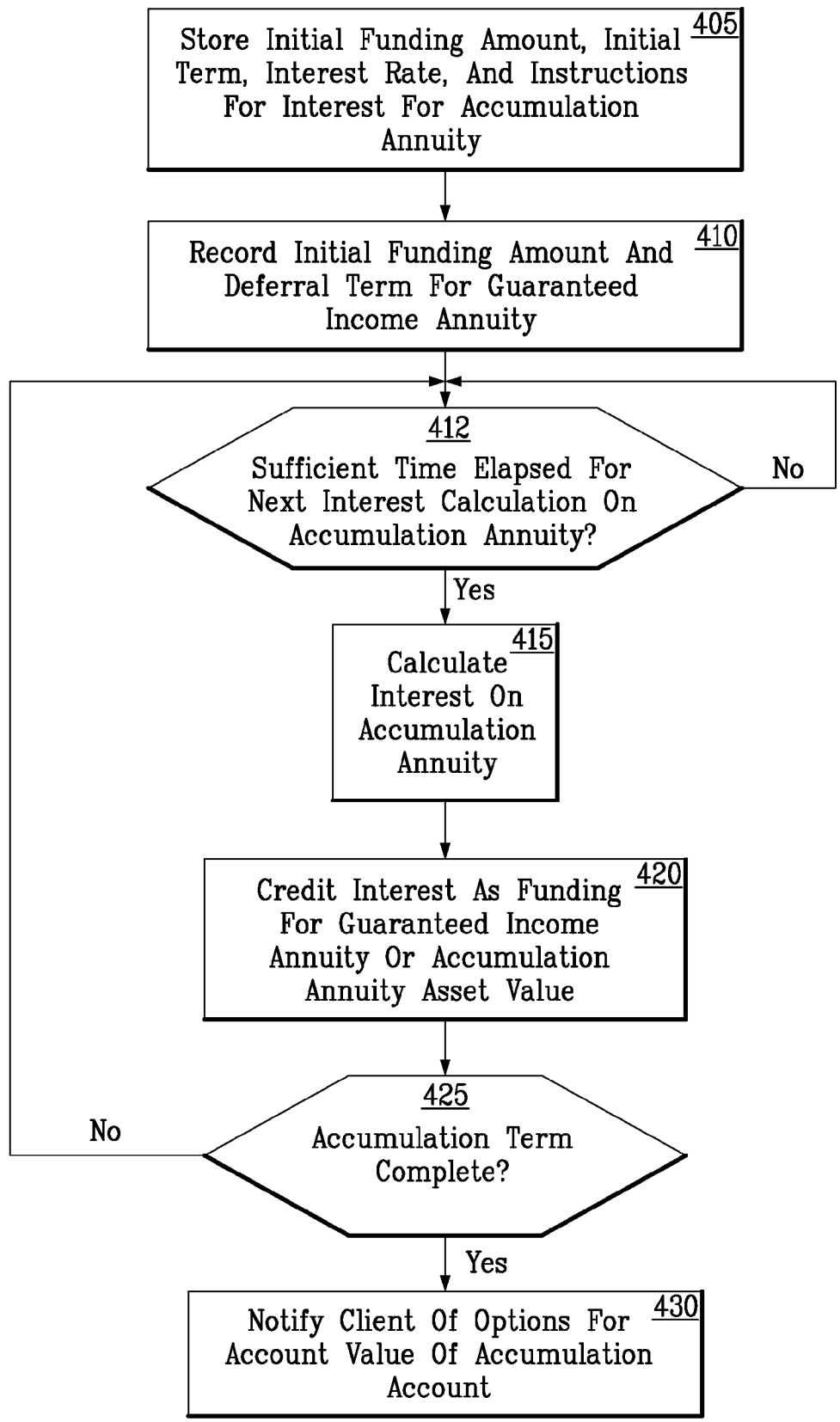
FIG. 4 is a detailed process flow diagram illustrating methods for administering annuities implemented by the computer system of FIG. 1.

Referring now to FIG. 4, a more detailed process flow of an implementation of a method of the invention will be explained. The contract with the insurance company involves the payment to the insurance company of an initial amount to fund an accumulation account. The accumulation annuity has a specified term and interest rate or formula for calculation of the interest rate, and instructions are specified for use of the interest. The interest may be credited to fund a guaranteed income annuity. Alternatively, the interest may be credited to the asset value of the accumulation annuity, or the interest may be divided according to a formula between those two purposes. The amount of the initial funding payment, term, interest rate and instructions are stored in memory, such as by processor 105 in data storage 130, as indicated at 405. The initial funding payment funds an accumulation annuity that has a periodic payment. Periodic payments may be at a fixed or variable interest rate. However, the account is not based on investment returns. The asset value of the accumulation account may be changed by withdrawals, charges or reinvestment of interest. The asset value of the accumulation account is not changed by the performance of any security or index. The asset value of the accumulation account is independent of the value of any security or index. By way of example, the periodic interest payments may be annual.

The funding and terms of the guaranteed income annuity are also stored in memory. An initial funding payment may fund the guaranteed income annuity. A deferral period for the guaranteed income annuity may be determined. A formula for calculation of payments on the guaranteed income annuity, based on timing of funding and other factors, may be provided. The payment amount, deferral period and formula may be stored in memory 410, such as by processor 105 storing the information in data storage 130.

Thereafter, during the accumulation annuity initial term, the processor 105 may check whether a sufficient time has elapsed to calculate interest payments 412. If sufficient time has elapsed, then the interest on the accumulation annuity is calculated by processor 105 and stored in memory, such as data storage 130, as indicated at 415. The calculated interest is then stored in data storage 130 by processor 105 as a credit funding a deferred guaranteed income annuity or the asset value of accumulation annuity 420. If the accumulation term is not complete 425, this process is repeated.

Upon expiration of the term of the accumulation account, or a suitable time period in advance of the expiration of the accumulation account, as determined by processor 105, the processor 105 may output a signal indicative of an instruction to generate a notification of expiration 430. In response to the signal, the customer may be notified of investment options for the account value of the accumulation account. As discussed above in connection with FIG. 3, there are a number of options with respect to renewals.

Figure 4B:
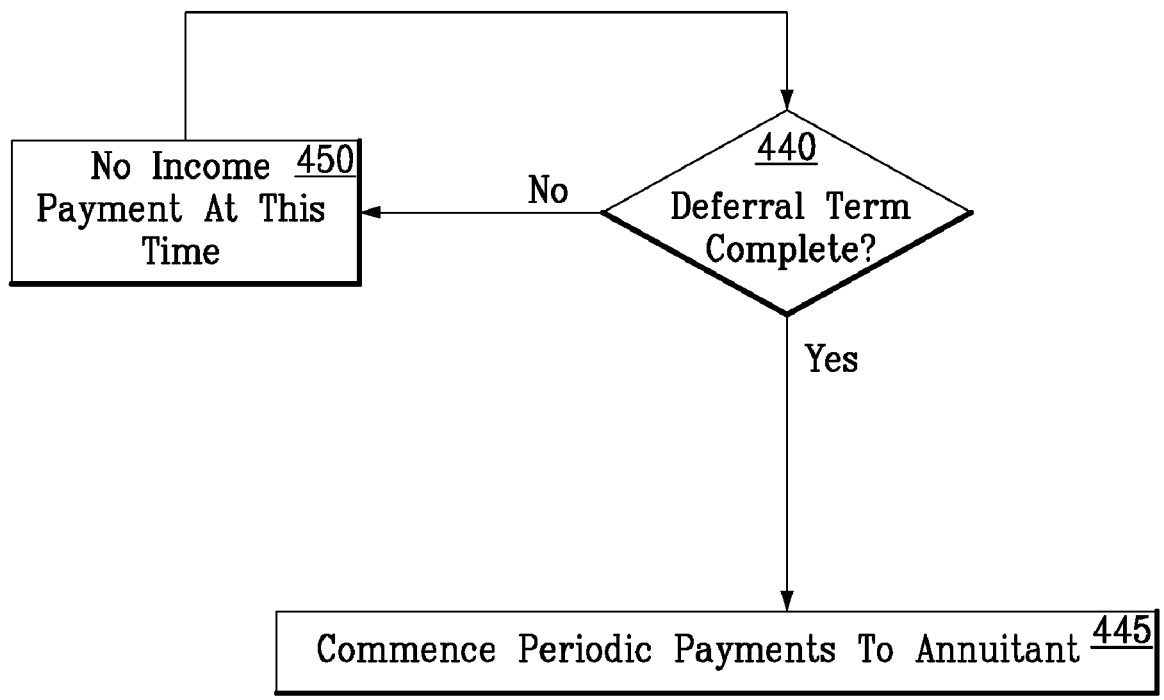

The deferred guaranteed income annuity has a deferral period. Referring to FIG. 4B, processor 105 determines whether the deferral period has been completed 440. At the completion of the deferral period, as determined by processor 105, the processor 105 calculates the amount (or checks the amount previously calculated) of a periodic payment, and provides an output signal indicative of an instruction to commence periodic payments to the annuitant, as indicated by block 445. If the processor 105 determines that the deferral period has not yet expired, no payment is made 450, and the process flow returns to periodically determining whether the deferral period has expired. The amount of the periodic payments depends on the amount and timing of the funding payments, and the deferral period. In general terms, the longer the deferral period, the greater the funding payments, the greater the elapsed time between the date of the funding period and the expiration of the deferral period, the greater the periodic payments to the annuitant. In an embodiment, level payments may continue for a specified term, or for the life of the annuitant. In other embodiments, the amount of payments may be variable and dependent on one or more factors. A formula for calculation of payment amounts is included in the annuity contract. Such formulas are well known to those of ordinary skill in the art of insurance annuities. The formula may be stored in memory by the processor 105 in data storage 130. The processor 105 may access the formula from data storage 130, temporarily retain the formula in local memory 120, access data relating to amounts and timing of funding payments stored in data storage 130, and calculate the amount of each payment using the accessed data and the formula. The processor may similarly access formulas and data for all other calculations required or desirable in implementation of the method of the invention.

Figure 5:
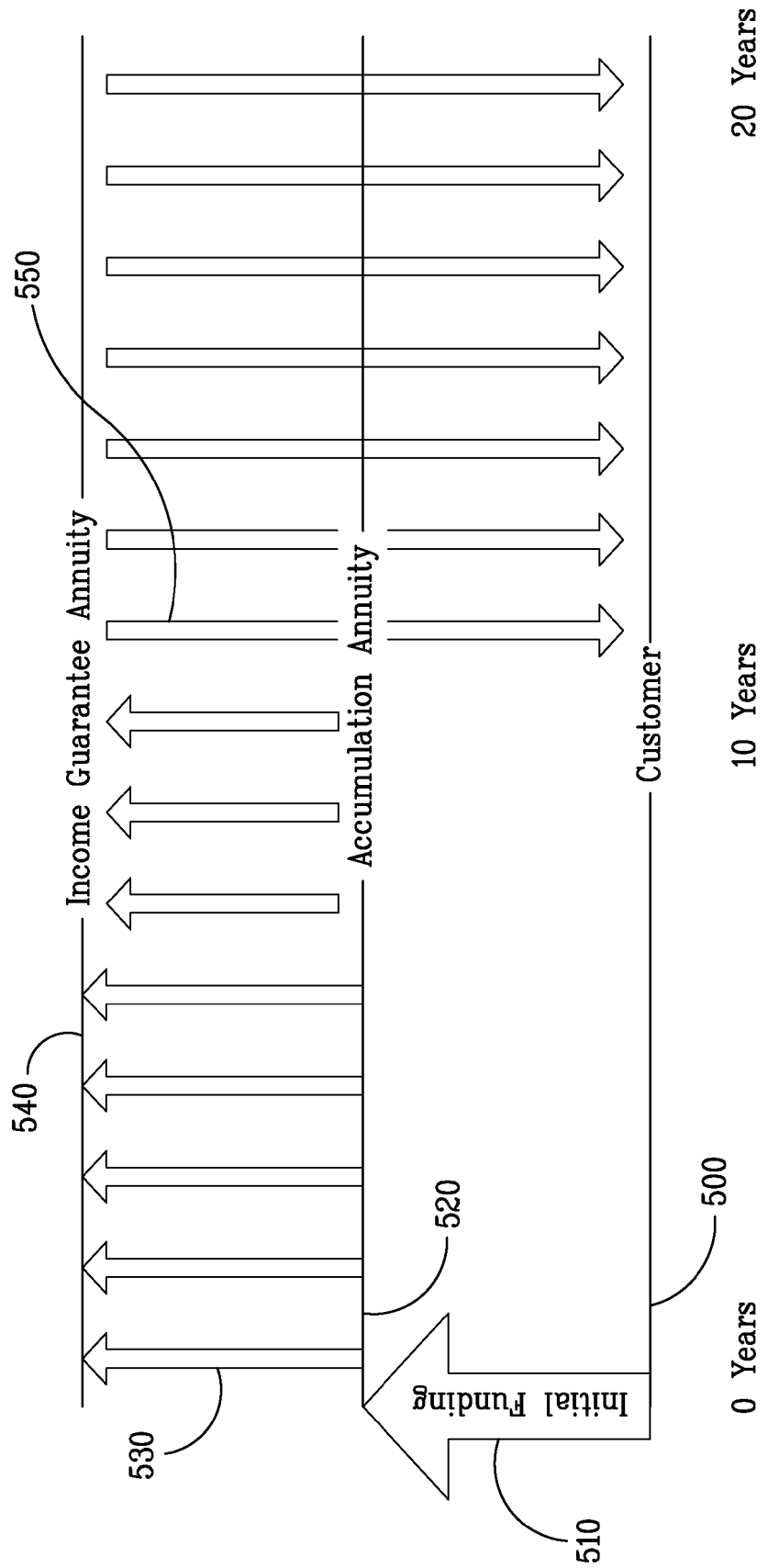
FIG. 5 is a schematic diagram illustrating the method of FIG. 3.

An embodiment of a method of the invention will now be explained with reference to FIG. 5. In FIG. 5, time progresses from left to right, with an exemplary period of 20 years illustrated. Customer 500 provides an initial funding payment 510 to accumulation annuity 520. Accumulation annuity provides periodic payments 530 to income guarantee annuity 540. After the end of the accumulation term, which is illustrated here as ten years, payments 530 cease. The accumulation annuity may be renewed, as illustrated here, and the gains, in the form of interest on the asset value, reinvested as increases in the asset value. The accumulation annuity continues to have an asset value during the renewal term. After the end of the deferral period, which is also ten years in this example, income guarantee annuity provides payments 550 to customer 500. In the deferred guaranteed income annuity, there is no asset value available for the use of the annuitant. As there is no asset value available, the guaranteed income annuity 550 is said to be completely annuitized.

Figure 6:
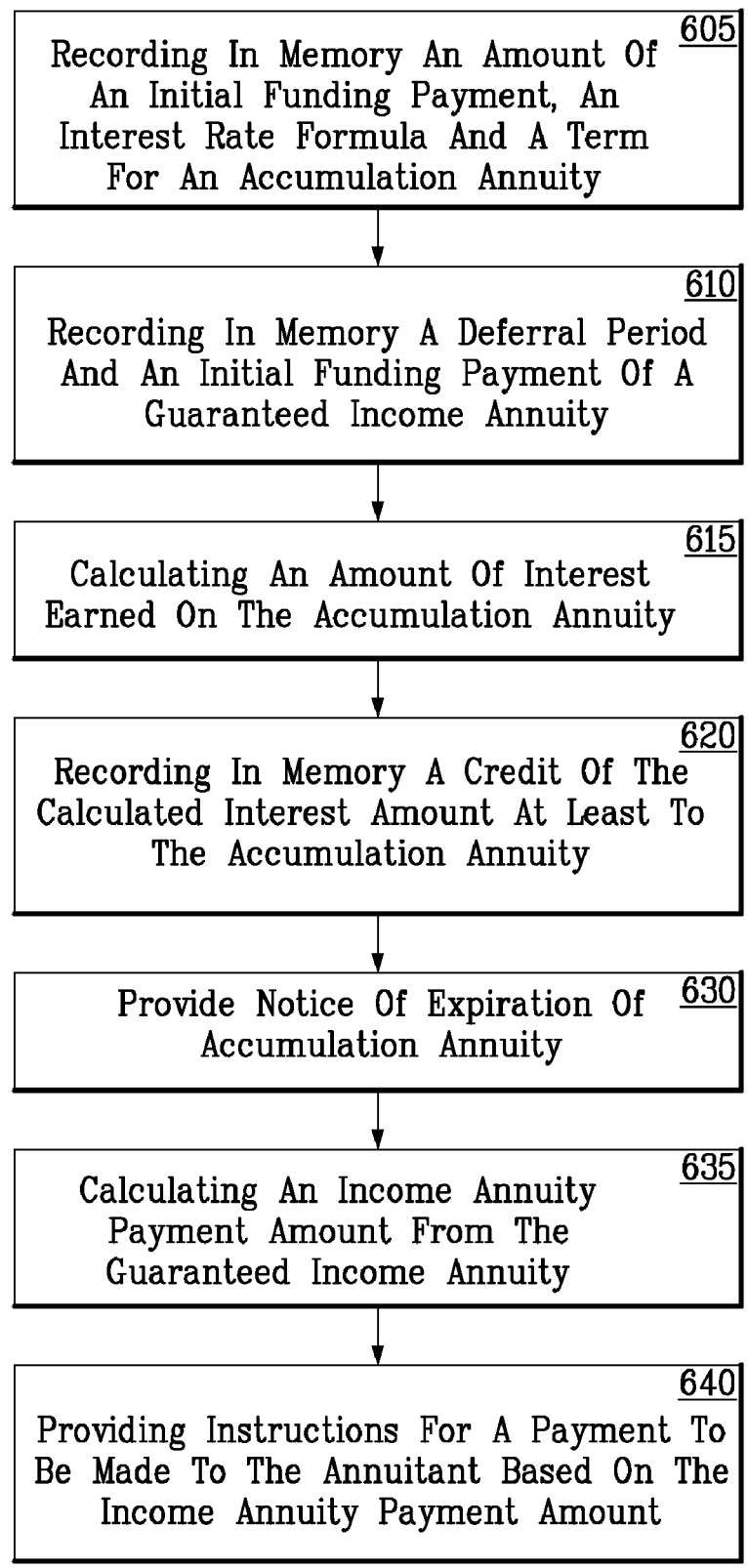
FIG. 6 is a process flow diagram of an alternative method for administering annuities implemented by the computer system of FIG. 1.

In another embodiment, both the accumulation annuity and the income guarantee income may be funded by initial payments. In this embodiment, the interest from the accumulation annuity may be entirely reinvested in the accumulation annuity. In the alternative, a portion of the interest from the accumulation annuity may be reinvested in the accumulation annuity, and a remaining portion contributed to the guaranteed income annuity. In this embodiment, referring to FIG. 6, with reference to the computer system of FIG. 1, processor 105 stores 605 in memory, such as data storage 130, an amount of an initial funding payment, an interest rate formula and a term for an accumulation annuity. The processor 105 also stores in memory 130 a deferral period and an initial funding payment of a guaranteed income annuity 610. Processor 105 may also store in memory a formula for calculation of the payment amounts of the guaranteed income annuity. If the current time is during the accumulation annuity term, as determined by processor 105, the processor 105 calculates 615 an amount of interest earned on the accumulation annuity. The processor 105 stores in memory 130 a credit of the calculated interest amount at least to the accumulation annuity 620. If the time is after the accumulation period, as determined by processor 105, the processor 105 provides an output signal including an instruction for a notice of expiration to be provided 630. In response to a notice of expiration, an annuitant may choose to renew the accumulation annuity, and may elect for payment to be reinvested or to be paid to the annuitant. If the time is after the expiration of the deferral period, as determined by processor 105, the processor 105 calculates an income annuity payment amount from the guaranteed income annuity 635, and provides an output signal indicative of instructions for a payment to be made to the annuitant based on the income annuity payment amount 640. In an embodiment, the processor 105 may store in memory 130 a credit of a portion of the calculated interest amount to the guaranteed income annuity.

Figure 7:
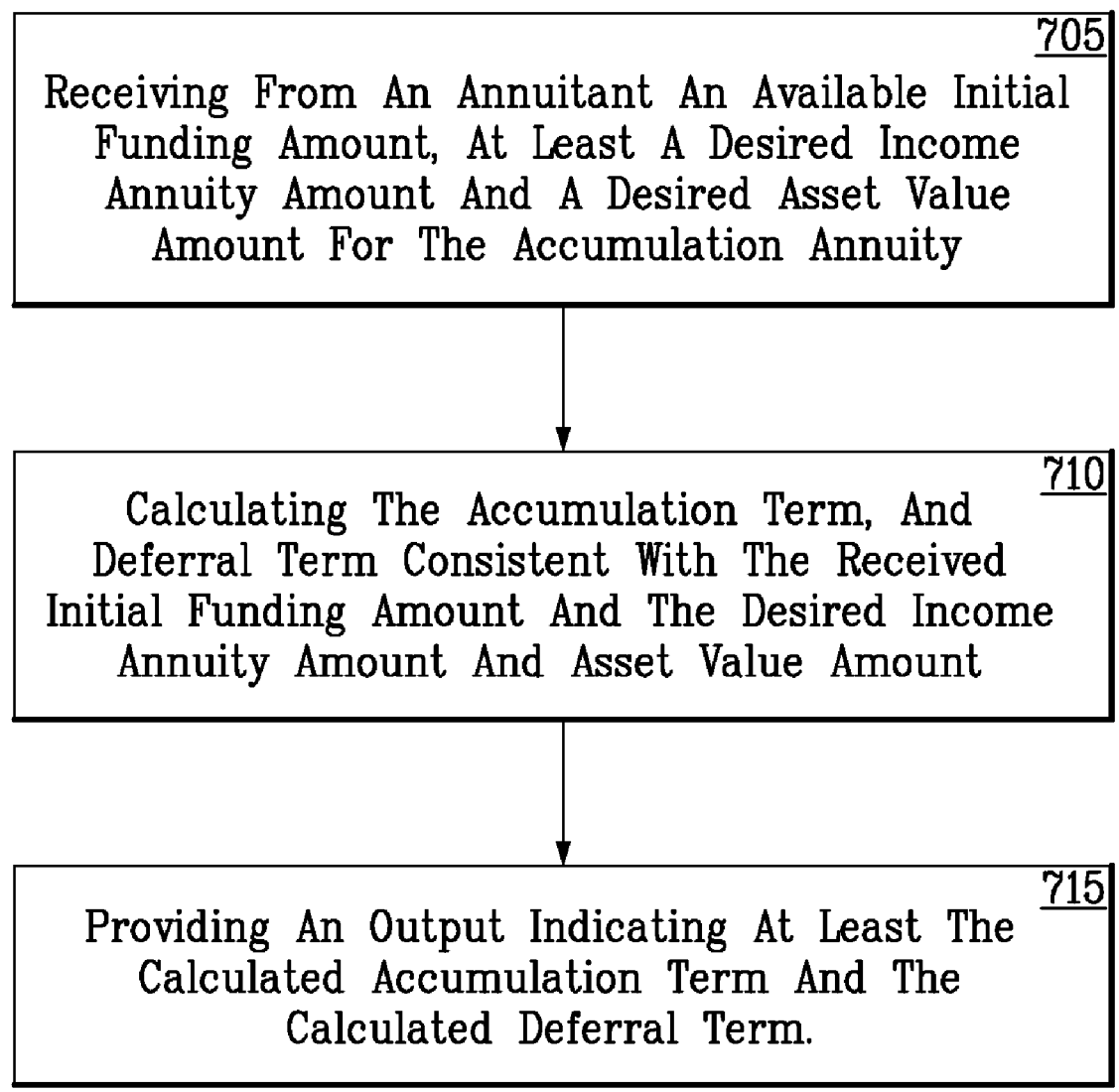
FIG. 7 is a process flow illustrating a method, implemented by the network of FIG. 2, of calculating parameters of annuities consistent with the process flows of FIGS. 3, 4 and 6.

In an implementation, it may be desirable to determine the terms of the annuity based on current assets of the annuitant and the income and asset goals of the annuitant. In an implementation, this process may be performed using the system of FIG. 2. Accordingly, referring to FIG. 7, with reference to the computer system of FIG. 2, a method may further include, prior to the time of storing an initial funding amount, receiving at processor 230, from an annuitant, or an annuitant's broker or other financial advisor, such as from client devices 205, 206, 207, and via the network, an available initial funding amount, at least a desired income annuity amount and a desired asset value amount for the accumulation annuity 705. The process flow then proceeds to processor 230 calculating the accumulation term, and deferral term consistent with the received initial funding amount and the desired income annuity amount and asset value amount 710. In so doing, the processor may access a suitable formula stored in data storage 250. The generation of suitable formulas is well-known to those of skill in the art of insurance annuities. The processor 230 may provide an output 515, such as via a web page transmitted to client device 205, 206, 207, a printout from a printer, or an audio message from an audio interface having audio cards and one or more speakers, indicating at least the calculated accumulation term and the calculated deferral term. It will be appreciated that the inputs received by the processor 230, and the corresponding formula accessed from data storage 250, may be varied. For example, the deferral period may be an input received by the processor, and the amount of the initial funding may be a result calculated by the processor and provided for output at client devices 205, 206, 207.

FIG. 6A is a table illustrating an exemplary implementation of a method and system according to the invention. In this implementation, a client, at an age of 67, funds the accumulation annuity, with a term of 10 years, with $100,000. The interest rate is a fixed 5.5%. All interest from the accumulation annuity is directed to the income guarantee, or HIS, annuity. The deferral period is ten years. The accumulation annuity is renewed for 10 years, with interest directed to reinvestment. As a result, the initial $100,000 investment results in $95,935 in income during the renewal term, and an asset value of $161,909, after 20 years.

FIG. 8B is a table, similar to FIG. 8A, differing only in that the income after renewal of accumulation annuity is directed to payments to the annuitant. Thus, the original $100,000 remains intact, and an annual income of $15,094 is received for the ten year renewal term.

FIG. 8C is a table, also similar to FIG. 8A, differing in that the initial funding, $100,000 in total, is split 75/25 between the accumulation annuity and the guaranteed income annuity, and further that the interest from the accumulation annuity is reinvested during the initial ten year term as well as during the renewal term. This example results in a greater accumulation of asset value than those of FIGS. 8A and 8B, but with a smaller annual income.

FIG. 8D, is a table, similar to FIG. 8C, differing in that the interest on the accumulation annuity during the ten-year renewal term is paid to the annuitant as income. This scenario results in a smaller asset value than the example of FIG. 8C, but a greater annual income during the renewal term. It will be appreciated that the annuitant may select from year to year whether to reinvest the income from the accumulation renewal or receive the interest as income.

FIG. 8E is a table, similar to FIG. 8A, but illustrating commencing the method at age 60, and including a second ten-year renewal. During the second ten-year renewal, interest earned on the accumulation annuity is credited to the asset value of the annuity. This scenario results in an increasing asset value to $276,565 after 30 years, with level income, starting after 10 years.

FIG. 8F is a table, similar to FIG. 8B, but illustrating commencing the method at age 60, and including a second ten-year renewal. Thus, during both renewal terms, interest earned on the accumulation annuity is paid to the annuitant as income. The guaranteed income annuity annual payments are less than in FIG. 8B, as the formula for payment level takes into account the age of the annuitant at the commencement of the stream of payments. The payment is less if the age of the annuitant is less, given the likelihood of an obligation to make payments over a greater period of time.

The present invention is operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by processor 110 executing instructions contained in programs which may be stored in a storage medium, such as local memory 120 or data storage 130. It will be appreciated that any of the steps in the methods in accordance with the invention described herein may be so implemented.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for administering an product that includes an accumulation annuity and a guaranteed income annuity, comprising:
   a processor;
   a memory in communication with the processor;
   the processor configured to:
      store in the memory an amount of an initial funding payment, an interest rate formula, and a term for the accumulation annuity;
      store in the memory at least a deferral period of the guaranteed income annuity, wherein the deferral period is greater than or equal to the term of the accumulation annuity;
      if the current time is during the term, calculate an amount of interest earned on the accumulation annuity;
      credit all of the calculated amount of interest earned on the accumulation annuity to the guaranteed income annuity, wherein a funding of the guaranteed income annuity is provided by the calculated amount of interest earned on the accumulation annuity only;
      determine whether the current time is after the accumulation annuity term, and if the current time is after the accumulation annuity term, provide an output signal indicative of an instruction to provide a notice of expiration;
      determine whether the current time is after an expiration of the deferral period, and, if the current time is after the expiration of the deferral period, calculate a guaranteed income annuity payment amount from the guaranteed income annuity; and
      provide an output signal indicative of instructions for a payment to be made to an annuitant based on the guaranteed income annuity payment amount; and
   a payment fulfillment system configured to, in accordance with data in the output signal indicative of the instructions for the payment to be made to the annuitant based on the guaranteed income annuity payment amount, effect the payment to the annuitant based on the guaranteed income annuity amount;

wherein an asset value of the accumulation annuity is independent of a value of a security or an index.

2. The system of claim 1, wherein the processor is further configured to, at the time of the storing of the initial funding payment, store in the memory an initial funding payment to the guaranteed income annuity.

3. The system of claim 1, wherein the processor is further configured to, at the time of the expiration of the deferral period, in response to a digital signal indicative of received customer instructions, store in the memory an instruction to renew the accumulation annuity, and to credit the interest on the accumulation annuity at least in part to the accumulation annuity.

4. The system of claim 1, wherein the processor is further configured to, at the time of the expiration of the deferral period, in response to a digital signal indicative of received customer instructions, store in the memory an instruction to renew the accumulation annuity and an instruction to provide payment to a customer of the interest on the renewed accumulation annuity.

5. The system of claim 1, wherein the processor is further configured to:
prior to the time of storing the initial funding payment, receive a digital signal indicative of an available initial funding amount, at least a desired income annuity amount, and a desired asset value amount for the accumulation annuity;
calculate the accumulation term and the deferral period consistent with the initial funding payment, the desired income annuity amount, and the asset value amount; and
provide an output indicating at least the calculated accumulation term and the calculated deferral period.

6. The system of claim 1, wherein the processor is further configured to:
prior to the time of storing the initial funding payment, receive a digital signal indicative of at least a desired income annuity amount, a desired asset value amount for the accumulation annuity, and a desired deferral period;
calculate the initial funding payment, the accumulation term consistent with the desired income annuity amount, the desired asset value amount, and the desired deferral period; and
provide an output indicating the calculated initial funding payment and the accumulation term.

7. The system of claim 1, further comprising:
a payment determination system having a processor configured to:
receive an output signal, determining payor account information and a payment method;
store the determined payor account information and the determined payment method in a memory of the payment determination system;
output a digital signal having data indicative of the stored determined payor account information, the stored determined payment method, amount information, and payee information; and
wherein the payment fulfillment system is configured to:
receive the digital signal having data indicative of the stored determined payor account information, the stored determined payment method, the amount information, and the payee information from the payment determination system; and
effect a payment in accordance with the stored determined payor account information and the stored determined payment method in addition to the data in the output signal indicative of instructions for a payment to be made to the annuitant based on the guaranteed income annuity payment amount.

8. The system of claim 7, wherein the payment fulfillment system is a check printing and mailing system for printing and mailing a check drawn on the payor account in an amount and to a payee as determined by the information conveyed by the digital signal from the processor of the payment determination system.

9. The system of claim 7, wherein the payment fulfillment system is a system for generating electronic funds transfer requests for providing of an instruction to a bank determined by the payor account information to provide an electronic funds transfer from the payor account to a payee account in an amount determined by the information conveyed by the digital signal from the processor of the payment determination system.

10. The system of claim 1, further comprising:
an input module, and
the processor configured to:
receive one or more of the initial funding payment amount, the interest rate formula, and the term for the accumulation annuity from the input module.

11. The system of claim 10, wherein the input module comprises a workstation having a keyboard and a pointing device.

12. A computer-implemented method for administering an annuity product, comprising:
storing by a processor in a memory in communication with the processor an amount of an initial funding payment, an interest rate formula, and a term for an accumulation annuity;
storing by the processor in the memory at least a deferral period of a guaranteed income annuity, wherein the deferral period is greater than or equal to the term of the accumulation annuity;
if the processor determines that the current time is during the term, calculating by the processor an amount of interest earned on the accumulation annuity, and storing by the processor the amount of interest in the memory;
crediting by the processor all of the calculated amount of interest earned on the accumulation annuity to the guaranteed income annuity, wherein a funding of the guaranteed income annuity is provided by the calculated amount of interest earned on the accumulation annuity only;
if the processor determines that the current time is after the accumulation annuity term, providing by the processor an output signal indicative of an instruction to provide a notice of expiration;
if the processor determines that the current time is after an expiration of the deferral period, calculating by the processor a guaranteed income annuity payment amount from the guaranteed income annuity;
providing by the processor an output signal indicative of instructions for a payment to be made to an annuitant based on the guaranteed income annuity payment amount and;
effecting by a payment fulfillment system the payment to the annuitant in accordance with the output signal indicative of the instructions for the payment to be made to the annuitant based on the guaranteed income annuity payment amount;
wherein an asset value of the accumulation annuity is independent of a value of a security or an index.

13. The method of claim 12, further comprising, at the time of the storing of the initial funding payment, storing by the processor in the memory an initial funding payment to the guaranteed income annuity.

14. The method of claim 12, further comprising, at the time of the expiration of the deferral period, in response to a digital signal indicative of received customer instructions, storing by the processor in the memory an instruction to renew the accumulation annuity, and to credit the interest on the accumulation annuity at least in part to the accumulation annuity.

15. The method of claim 12, further comprising, at the time of the expiration of the deferral period, in response to a digital signal indicative of received customer instructions, storing by the processor in the memory an instruction to renew the accumulation annuity and an instruction to provide payment to a customer of the interest on the renewed accumulation annuity.

16. The method of claim 12, further comprising:
   prior to the time of storing the initial funding payment, receiving a digital signal indicative of an available initial funding amount, at least a desired income annuity amount, and a desired asset value amount for the accumulation annuity;
   calculating by the processor the accumulation term and the deferral period consistent with the initial funding payment, the desired income annuity amount, and the asset value amount; and
   providing by the processor an output indicating at least the calculated accumulation term and the calculated deferral period.

17. The method of claim 12, further comprising:
   prior to the time of storing the initial funding payment, receiving a digital signal indicative of at least a desired income annuity amount, a desired asset value amount for the accumulation annuity, and a desired deferral period;
   calculating by the processor the initial funding payment, the accumulation term consistent with the desired income annuity amount, the desired asset value amount, and the desired deferral period; and
   providing by the processor an output indicating the calculated initial funding payment and the accumulation term.

18. The method of claim 12, further comprising:
   receiving an output signal at a processor of a payment determination system;
   determining by the processor of the payment determination system payor account information and a payment method, and storing of the determined payor account information and the determined payment method in a memory by the processor of the payment determination system;
   outputting by the processor of the payment determination system a digital signal having data indicative of the stored determined payor account information, the stored determined payment method, amount information, and payee information;
   receiving by a processor of the payment fulfillment system the digital signal having data indicative of the stored determined payor account information, the stored determined payment method, the amount information, and the payee information from the payment determination system; and
   effecting by the payment fulfillment system a payment in accordance with the data indicative of the stored determined payor account information and the stored determined payment method conveyed by the digital signal from the processor of the payment determination system in addition to the data in the output signal indicative of instructions for a payment to be made to the annuitant based on the guaranteed income annuity payment amount.

19. The method of claim 18, wherein the payment fulfillment system is a check printing and mailing system, and wherein the fulfillment comprises printing and mailing a check drawn on the payor account in an amount and to a payee as determined by the information conveyed by the digital signal from the processor of the payment determination system.

20. The method of claim 18, wherein the payment fulfillment system is a system for generating electronic funds transfer requests, and wherein the fulfillment comprises providing by the payment fulfillment system of an instruction to a bank determined by the payor account information to provide an electronic funds transfer from the payor account to a payee account in an amount determined by the information conveyed by the digital signal from the processor of the payment determination system.

21. A non-transitory computer-readable medium having a plurality of instructions thereon which, when executed by a processor, cause the processor to:
   store in a memory an amount of an initial funding payment, an interest rate formula, and a term for an accumulation annuity;
   store in the memory at least a deferral period of a guaranteed income annuity, wherein the deferral period is greater than or equal to the term of the accumulation annuity;
   determine if the current time is during the term, and, if the current time is during the term, calculate an amount of interest earned on the accumulation annuity;
   credit all of the calculated amount of interest earned on the accumulation annuity to the guaranteed income annuity, wherein a funding of the guaranteed income annuity is provided by the calculated amount of interest earned on the accumulation annuity only;
   determine if the current time is after the accumulation annuity term and, if the current time is after the accumulation annuity term, provide an output signal indicative of an instruction to provide a notice of expiration;
   determine if the current time is after an expiration of the deferral period, and, if the current time is after the expiration of the deferral period, calculate a guaranteed income annuity payment amount from the guaranteed income annuity; and
   provide an output signal indicative of instructions for a payment to be made to an annuitant based on the guaranteed income annuity payment amount, the output signal being effective to cause a payment fulfillment system to effect the payment to the annuitant in accordance with the instructions for the payment to be made to the annuitant based on the guaranteed income annuity payment amount,
   wherein an asset value of the accumulation annuity is independent of a value of a security or an index.

22. The non-transitory computer-readable medium of claim 21, wherein the instructions further cause the processor to store in the memory an initial funding payment to the guaranteed income annuity.

23. The non-transitory computer-readable medium of claim 21, wherein the instructions further cause the processor to:
   at the time of the expiration of the deferral period, in response to a digital signal indicative of received customer instructions, store in the memory an instruction to renew the accumulation annuity; and
   credit the interest on the accumulation annuity at least in part to the accumulation annuity.

* * * * *

UNITED STATES PATENT AND TRADEMARK OFFICE
CERTIFICATE OF CORRECTION

| | | |
|---|---|---|
| PATENT NO. | : 8,224,673 B2 | Page 1 of 1 |
| APPLICATION NO. | : 12/123739 | |
| DATED | : July 17, 2012 | |
| INVENTOR(S) | : Philip W. Michalowski, Keith E. Golembiewski and Joseph M. Weiss | |

It is certified that error appears in the above-identified patent and that said Letters Patent is hereby corrected as shown below:

Column 10, line 30, in Claim 1, insert the word --annuity-- after the word "an" and before the word "product".

Signed and Sealed this
Twenty-eighth Day of August, 2012

David J. Kappos
*Director of the United States Patent and Trademark Office*